US009623556B1

(12) United States Patent
Urata et al.

(10) Patent No.: US 9,623,556 B1
(45) Date of Patent: Apr. 18, 2017

(54) ROBOTIC SOLE JOINT

(71) Applicant: X Development LLC, Mountain View, CA (US)

(72) Inventors: Junichi Urata, Tokyo (JP); Masaki Hamafuji, Tokyo (JP)

(73) Assignee: X Development LLC, Mountain View, CA (US)

(*) Notice: Subject to any disclaimer, the term of this patent is extended or adjusted under 35 U.S.C. 154(b) by 56 days.

(21) Appl. No.: 14/613,653

(22) Filed: Feb. 4, 2015

Related U.S. Application Data

(60) Provisional application No. 62/045,066, filed on Sep. 3, 2014.

(51) Int. Cl.
| | | |
|---|---|---|
| G05B 15/00 | (2006.01) | |
| G05B 19/00 | (2006.01) | |
| B25J 9/16 | (2006.01) | |
| B25J 17/00 | (2006.01) | |
| B62D 57/02 | (2006.01) | |

(52) U.S. Cl.
CPC ............ B25J 9/1633 (2013.01); B25J 17/00 (2013.01); B62D 57/02 (2013.01)

(58) Field of Classification Search
USPC ................. 700/245, 260, 246, 253, 257; 318/568.12; 901/1
See application file for complete search history.

(56) References Cited

U.S. PATENT DOCUMENTS

| | | | | |
|---|---|---|---|---|
| 5,432,417 A * | 7/1995 | Takenaka | ............. | B62D 57/032 180/8.6 |
| 5,459,659 A * | 10/1995 | Takenaka | ............. | B62D 57/032 180/8.1 |
| 5,936,367 A * | 8/1999 | Takenaka | ............... | B62D 57/02 180/8.6 |
| 6,289,265 B1 * | 9/2001 | Takenaka | ................... | B25J 5/00 318/568.1 |
| 6,301,524 B1 * | 10/2001 | Takenaka | ............... | B62D 57/02 318/568.12 |
| 6,583,595 B1 * | 6/2003 | Hattori | ................. | B62D 57/032 318/567 |
| 8,447,429 B2 | 5/2013 | Chang et al. | | |
| 8,612,052 B2 | 12/2013 | Nagasaka | | |
| 8,738,178 B2 | 5/2014 | Choi et al. | | |
| 2003/0144763 A1 * | 7/2003 | Mori | .................... | B62D 57/032 700/245 |
| 2004/0036437 A1 * | 2/2004 | Ito | ............................ | B25J 9/163 318/568.12 |

(Continued)

*Primary Examiner* — Ronnie Mancho
(74) *Attorney, Agent, or Firm* — McDonnell Boehnen Hulbert & Berghoff LLP

(57) ABSTRACT

Disclosed are robotic systems, methods, bipedal robot devices, and computer-readable mediums. For example, a robotic system may include a robotic leg connected to a main body and a robotic foot. A robotic sole joint may be connected to the robotic leg, where the robotic sole joint is located at a sole of the robotic foot. The robotic leg and the robotic foot may be movable around an axis of rotation defined by the robotic sole joint. A movement around the axis may cause a ZMP to shift from a first location to a second location in the robotic foot. A measure of force applied by the robotic sole joint around the axis may be approximately equal to zero.

20 Claims, 9 Drawing Sheets

(56) References Cited

U.S. PATENT DOCUMENTS

| | | | |
|---|---|---|---|
| 2004/0176875 A1* | 9/2004 | Iribe | G06N 3/008 700/245 |
| 2005/0021176 A1* | 1/2005 | Takenaka | B62D 57/032 700/245 |
| 2005/0110448 A1* | 5/2005 | Takenaka | B62D 57/032 318/568.12 |
| 2006/0173578 A1* | 8/2006 | Takenaka | B62D 57/032 700/245 |
| 2007/0168080 A1* | 7/2007 | Takenaka | B62D 57/032 700/245 |
| 2008/0208391 A1* | 8/2008 | Hasegawa | B62D 57/032 700/245 |
| 2009/0099689 A1* | 4/2009 | Takenaka | B62D 57/032 700/245 |
| 2009/0171503 A1* | 7/2009 | Takenaka | B62D 57/032 700/250 |
| 2010/0113980 A1* | 5/2010 | Herr | A61F 2/60 600/587 |
| 2010/0114329 A1* | 5/2010 | Casler | B25J 19/0008 623/24 |
| 2010/0185301 A1* | 7/2010 | Hansen | A61F 2/6607 623/47 |
| 2011/0196532 A1 | 8/2011 | Chang et al. | |
| 2011/0264264 A1* | 10/2011 | Shirokura | B62D 57/032 700/245 |
| 2012/0197435 A1 | 8/2012 | Maisonnier et al. | |
| 2013/0006386 A1* | 1/2013 | Hansen | A61F 2/6607 623/24 |

* cited by examiner

ROBOTIC SOLE JOINT

CROSS-REFERENCE TO RELATED APPLICATION

This application claims the benefit of U.S. Provisional Application No. 62/045,066, filed Sep. 3, 2014.

BACKGROUND

One type of a robot system may be a humanoid robot. These robotic systems may have a structure that resembles a human body. One example robot system may have a robotic head, two robotic arms, a main robotic body, and two robotic legs. The robotic system may stand with the two robotic legs. For example, each of the robotic legs may include a robotic knee, a robotic ankle, and a robotic foot. As such, the robotic system may stand with the robotic legs to stabilize the robotic system. For instance, the two robotic legs may bear the weight of the robotic system while balancing the robotic system's full body dynamics.

SUMMARY

An example robotic system may include a zero moment point (ZMP) located in a robotic foot where a sum of all the forces acting on that point in the robotic foot equals approximately zero. If the ZMP moves to given locations of the robotic foot, e.g., the edges of the robotic foot, the robotic system may lose its balance and fall over. Yet, by confining or restraining the ZMP to certain locations of the robotic foot, the balance of the robotic system may be maintained. In some instances, the robotic foot may include a robotic sole joint connecting a robotic leg to the sole of the robotic foot. As such, the robotic leg may rotate about the robotic sole joint to confine the ZMP to certain locations of the robotic foot and thus, maintaining the balance of the robotic system. As such, example implementations herein disclose robotic systems, computer-readable mediums, and methods, to implement a robotic sole joint that may be used to confine the ZMP to the certain locations of the robotic foot.

In one implementation, a robotic system is provided. The robotic system includes a robotic leg connected to a main body. Further, the robotic system includes a robotic foot, where a zero moment point (ZMP) is located at a first location in the robotic foot where a sum of a first plurality of forces acting on the robotic foot is approximately equal to zero. Yet further, the robotic system includes a robotic sole joint connected to the robotic leg, where the robotic sole joint is located at a sole of the robotic foot, where the robotic leg and the robotic foot are movable around an axis of rotation defined by the robotic sole joint. In addition, a movement around the axis causes the ZMP to shift from the first location to a second location in the robotic foot where a sum of the second plurality of forces acting on the robotic foot is approximately equal to zero, where a measure of force applied by the robotic sole joint around the axis is approximately equal to zero.

In another implementation, a robotic system is provided. The robotic system includes one or more processors, a robotic leg connected to a main body, and a robotic sole joint connected to the robotic leg, where the robotic sole joint is located at a sole of a robotic foot. Further, a zero moment point (ZMP) is located at a first location in the robotic foot where a sum of a first plurality of forces acting on the robotic foot is approximately equal to zero. Yet further, the robotic system includes a computer-readable medium having stored thereon program instructions that, when executed by the one or more processors, cause the robotic system to perform operations. The operations include determining a second location in the robotic foot to balance weight of the robotic system on the robotic foot. Further, the operations include causing movement around an axis of rotation defined by the robotic sole joint, where the movement causes the ZMP to shift from the first location to a second location in the robotic foot where a sum of a second plurality of forces acting on the robotic foot is approximately equal to zero. Yet further, a measure of force applied by the robotic sole joint around the axis is approximately equal to zero.

Yet another implementation includes determining a zero moment point (ZMP) located at a first location in a robotic foot where a sum of a first plurality of forces acting on the robotic foot is approximately equal to zero, where a robotic leg is connected to a robotic sole joint located at a sole of the robotic foot. Further, the implementation includes determining a second location in the robotic foot where weight of the robotic system shifts to balance the weight of the robotic system on the robotic foot. Yet further, the implementation includes detecting a change from the first plurality of forces to a second plurality of forces acting on the robotic foot. In addition, based on the change, the implementation includes causing movement around an axis of rotation defined by the robotic sole joint, where the movement causes the ZMP to shift from the first location to the second location in the robotic foot where a sum of the second plurality of forces acting on the robotic foot is approximately equal to zero. Further, where a measure of force applied by the robotic sole joint around the axis is approximately equal to zero.

In still another implementation, a robotic system is provided. The robotic system includes one or more processors, a robotic leg connected to a main body, and a robotic sole joint connected to the robotic leg, where the robotic sole joint is located at a sole of a robotic foot. Further, a zero moment point (ZMP) is located at a first location in the robotic foot where a sum of a first plurality of forces acting on the robotic foot is approximately equal to zero. Yet further, the robotic system includes means for determining a second location in the robotic foot to balance weight of the robotic system on the robotic foot. Yet further, the robotic system includes means for causing movement around an axis of rotation defined by the robotic sole joint, where the movement causes the ZMP to shift from the first location to a second location in the robotic foot where a sum of a second plurality of forces acting on the robotic foot is approximately equal to zero. In addition, a measure of force applied by the robotic sole joint around the axis is approximately equal to zero.

These as well as other implementations, aspects, advantages, and alternatives will become apparent to those of ordinary skill in the art by reading the following detailed description, with reference where appropriate to the accompanying drawings. Further, this summary and other descriptions and figures provided herein are intended to illustrate implementations by way of example only and numerous variations are possible. For instance, structural elements and process steps can be rearranged, combined, distributed, eliminated, or otherwise changed, while remaining within the scope of the implementations as claimed.

DETAILED DESCRIPTION

Figure 1:
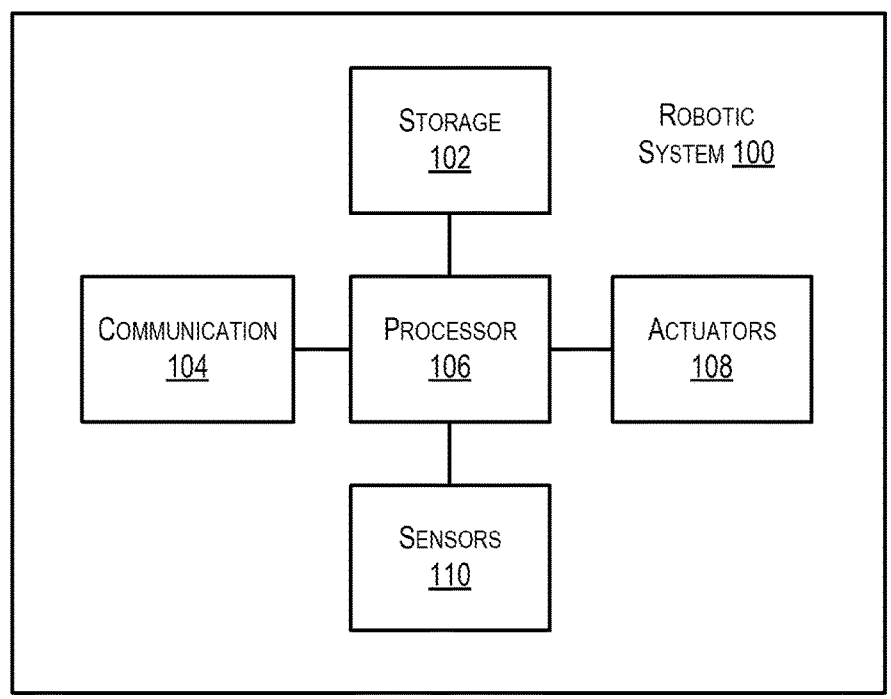
FIG. 1 depicts aspects of a robotic system, according to an example implementation.

Example systems, methods, devices, and computer-readable mediums are described herein. It should be understood that the words "example" and "exemplary" are used herein to mean "serving as an example, instance, or illustration." Any implementation or feature described herein as being an "example" or "exemplary" is not necessarily to be construed as preferred or advantageous over other implementations or features. Other implementations can be utilized, and other changes can be made, without departing from the scope of the subject matter presented herein.

Thus, the example implementations described herein are not meant to be limiting. The aspects of the present disclosure, as generally described herein, and illustrated in the figures, can be arranged, substituted, combined, separated, and designed in a wide variety of different configurations, all of which are explicitly contemplated herein.

I. OVERVIEW

A robotic system may be a humanoid robot with two robotic legs that bear the weight of the robotic system. For example, the weight of the robotic system may rest on each of the robotic legs while the robotic system is in a standing position. As such, approximately half of the weight may be placed on one robotic foot and the other approximate half of the weight may be placed on the other robotic foot.

To preserve the stability of the robotic system, a zero moment point (ZMP) in one of the two robotic feet may be determined. For example, the ZMP may be a specific point in the sole of the robotic foot where the sum of forces acting on that specific point is approximately equal to zero. These forces may include, for example, the weight of the robotic system acting down on the sole of the robotic foot and a ground force acting upwards against the sole of the robotic foot, among other possibilities. In such instances, these forces may cancel each other such that the sum of the forces is approximately equal to zero.

By confining or restraining the ZMP to certain locations of the robotic foot, the robotic system may maintain its balance. For example, keeping the ZMP confined to a central portion of the robotic foot may cause the robotic system to stabilize and prevent the robotic system from falling over. In one particular scenario, consider a robotic leg resembling the structure of a human leg. The robotic leg may be connected to a robotic ankle joint adjacent or just above the robotic foot. As such, to keep the ZMP confined to the central portion of the robotic foot, the robot system may apply a torque about the robotic ankle joint. This torque may balance the weight of the robot system over the central portion of the robotic foot, causing the ZMP to be confined to the central portion of the robotic foot.

Yet, the scenario of the robotic ankle joint may face challenges. For example, the amount of torque applied by the robotic ankle may be difficult to determine or control. In particular, it may be difficult to determine the amount of torque necessary to confine the ZMP to the middle part of the robotic foot. Further, the complexity of the robotic system's full-body dynamics may further complicate the process for determining this amount of torque. For example, the amount of torque applied by the robotic ankle may be different when the robotic system is standing on a flat surface versus an inclined surface.

Thus, in other examples, the robotic ankle joint of the robot system may be replaced with a different joint located at the sole of the robotic foot. This robotic sole joint may connect the robotic leg to the robotic foot at the sole of the robotic foot. In this particular implementation, the robotic system may keep the ZMP confined to the central portion of the robotic foot without applying any torque about this robotic sole joint. As such, the robot may be able to balance its weight over the robotic foot without determining the amount of torque necessary to confine the ZMP to the central portion of the robotic foot.

II. EXAMPLE ROBOTIC SYSTEMS

FIG. 1 depicts aspects of a robotic system, according to an example implementation. In some examples, robotic system 100 may include computer hardware, such as a storage 102, a communication component 104, a processor 106, actuators 108, and sensors 110. For example, one or more of these hardware components may be designed for a robotic system 100 such as a humanoid robot and/or a bipedal-robot device.

Storage 102 may be a memory that includes a non-transitory computer-readable medium having stored thereon program instructions. The processor 106 may be coupled to the storage 102 to cause the robotic system 100 to perform operations based on executing these program instructions. Further, the processor 106 may be coupled to the communication component 104 for communicating with other robotic systems, robots, and/or devices. For example, communication component 104 may be used to access one or more server devices of a network. In some implementations, communication component 104 may include a wired connection including, for example, a parallel bus or a serial bus such as a Universal Serial Bus (USB). Further, communication component 104 may include a wireless connection including, for example, Bluetooth, IEEE 802.11, Cellular (such as GSM, CDMA, UMTS, EV-DO, WiMAX, or LTE), or Zigbee, among other possibilities.

Processor 106 may store, in the storage 102, data obtained from the sensors 110. In some examples, sensors 110 may include a gyroscope, an accelerometer, a Doppler sensor, a sonar sensor, a radar device, a laser-displacement sensor, and/or a compass, possibly to measure locations and/or movements of the robotic system 100. Yet further, sensors 110 may include an infrared sensor, an optical sensor, a light sensor, a camera, a biosensor, a capacitive sensor, a touch sensor, a temperature sensor, a wireless sensor, a radio sensor, a sound sensor, and/or a smoke sensor, possibly to obtain data indicative of an environment of the robotic system 100. In addition, sensors 110 may include a sensor that measure forces acting about the robotic system 100. For example, sensors 110 may include a sensor that measures forces (e.g., inertial forces and/or G-forces) in multiple dimensions. Further, sensors 110 may include a sensor that measures torque (possibly referred to herein as a "force-torque sensor"), a sensor that measures ground forces (possibly referred to a "ground force sensor" and/or a "friction sensor"), and a zero moment point (ZMP) sensor that identifies ZMPs and/or locations of the ZMPs, among other possibilities.

The robotic system 100 may also have actuators 108 that enable the robotic system 100 to initiate movements. For example, the actuators 108 may include or be incorporated with robotic joints connecting robotic limbs to a robotic body. For example, the actuators 108 may include robotic hip joints connecting robotic legs to the robotic body. Further, the actuators 108 may include robotic knee joints connecting parts (e.g., robotic thighs and robotic calves) of the robotic legs. Yet further, the actuators 108 may include robotic ankle joints connecting the robotic legs to robotic feet. In addition, the actuators 108 may include motors for moving the robotic limbs. As such, the actuators 108 may enable the mobility of the robotic system 100 in an environment of the robotic system 100.

The robotic system 100 may include one or more direct current (DC) motors, permanent magnet motors, fuel powered motors (e.g., gasoline and/or gas powered motors), and/or servo motors to move the robotic limbs. Such motors may allow the robotic system 100 to have precise control of its actuators 108 and the movement of the robotic limbs. Yet, such motors may also be heavy, thereby causing the robotic system 100 to consume more power to move robotic limbs. Further, the weight of the motors may cause the robotic legs to make heavy impacts with the ground, possibly damaging the robotic legs over time and/or after traveling long distances. In some implementations, the robotic system 100 may include hydraulic mechanisms to move the robotic limbs. The hydraulic systems may give the robotic system 100 more strength, enabling the robotic system 100 to lift heavy objects. Yet, the hydraulic mechanisms may require pumps that may be bulky, taking up additional space in the robotic system. In addition, the hydraulic mechanisms may be difficult to control such that the robotic movements may appear spastic, jerky, and/or less precise.

Thus, the robotic system 100 may include smaller and/or lightweight motors to move the robotic limbs. Yet, such motors may encounter challenges as well. For example, the actuators 108 with smaller motors may deliver a limited amount of power. Thus, decreasing the size of motors may cause the robotic system 100 to be weaker. Further, driving the motors at higher speeds may cause the motors to emanate thermal energy, possibly overheating the robotic system. Yet further, it may be difficult to determine the internal temperature of the motors to prevent the robotic system from overheating.

Figure 2:
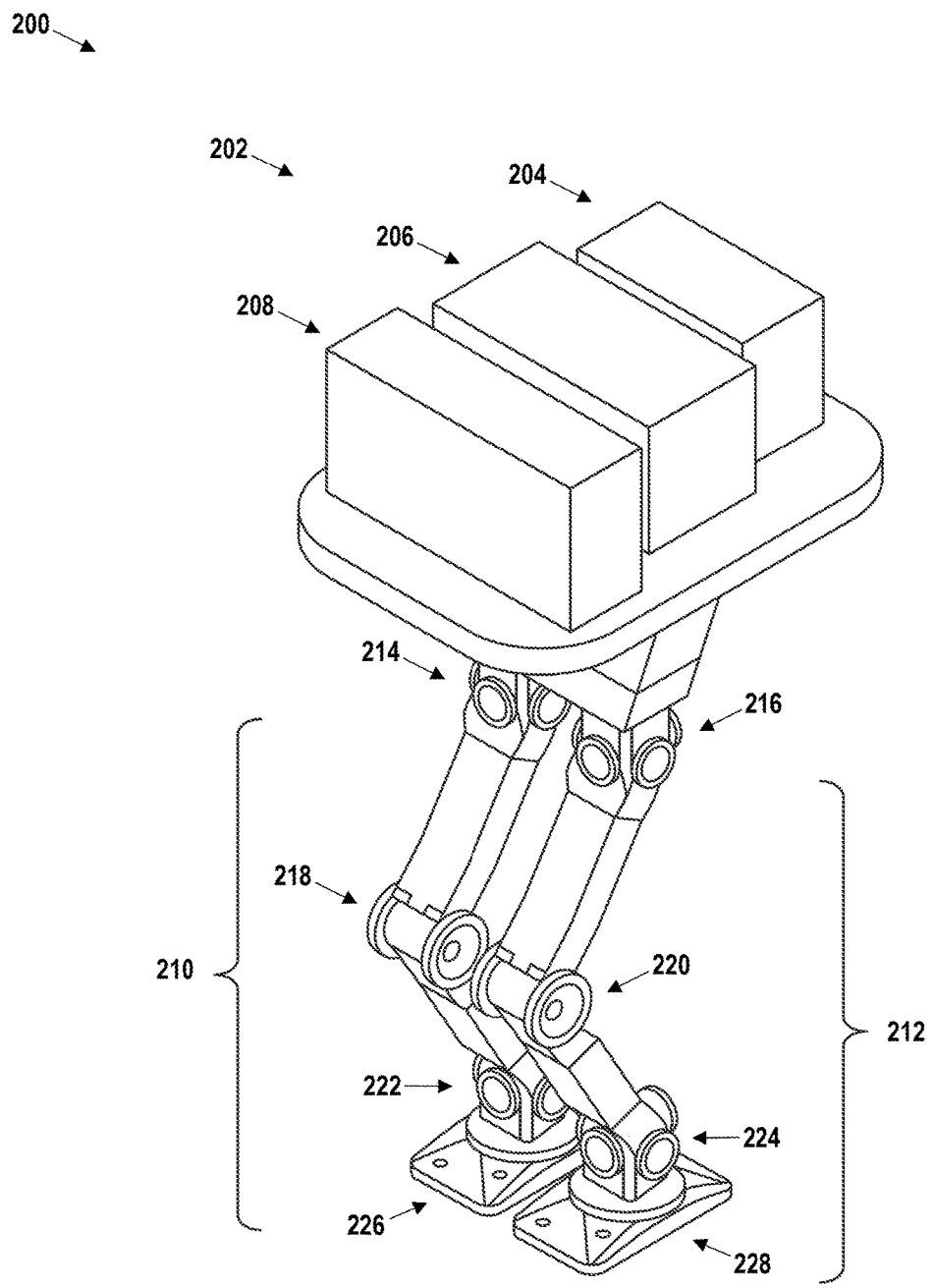
FIG. 2 depicts aspects of a robotic system, according to an example implementation.

FIG. 2 depicts aspects of a robotic system, according to an example implementation. The robotic system 200 may include, for example, one or more parts of the robotic system 100 in relation to FIG. 1. For example, the robotic legs 210 and 212 may include sensors 110, such as sensors that measure inertial forces and/or G-forces in multiple dimensions, a force-torque sensor, a ground force sensor, a friction sensor, and/or a ZMP sensor, among other possibilities.

As shown, a robotic body 202 that may include a battery 204, a radiator 206, and a capacitor 208. The robotic system 200 may also include two robotic hips 214 and 216, connecting the robotic body 202 to two robotic legs 210 and 212, respectively. Further, the two robotic legs 210 and 212 may include two robotic knee joints 218 and 220, two robotic ankle joints 222 and 224, and two robotic feet 226 and 228, respectively. The robotic system 200 may weigh approximately 30 to 80 kilograms.

Battery 204 may be used to power the robotic system 200. Radiator 206 may transfer thermal energy from one part of the robotic system 200 to another for cooling the robotic system 200. The radiator 206 may provide liquids to cool the motors in the robotic system 200. Capacitor 208 may be a multi-layered capacitor (e.g., a double-layered capacitor) operable to produce current in a shortened period of time. The capacitor 208 may produce currents to power the motors when the available power capacity in the capacitor 208 is lower than one or more capacity thresholds. For example, the capacitor 208 may supply varying amounts of current to motors and drivers in the robotic legs 210 and 212, possibly more reliably than the battery 204. In some instances, the capacitor 208 may operate with an approximate voltage of 50-150 V, an approximate capacitance of 7-21 farads, and an approximate internal resistance of 25-150 mΩ.

The robotic system 200 may include one or more motors powered by the capacitor 208. For example, the robotic system 200 may include one or more of the motors that generate heat and are cooled by lower temperature liquids around the motors. For example, the robotic knee joints 218 and 220 may include motors cooled by liquids to achieve rotational speeds over approximately 1,000-2,000 degrees per second and over approximately 350-700 newton meters (Nm) of torque.

Further, the motors cooled by liquids may be used to move robotic hips 214 and 216. Additionally, these motors may be used to move the robotic legs 210 and 212. In particular, these motors may be positioned in the robotic knee joints 218 and 220, and the robotic ankle joints 222 and 224. As such, the robotic system 200 may engage in bipedal walking, possibly resembling the walking patterns of a human person. The weight of the robotic system 200 may shift on to each of the robotic legs 210 and 212 interchangeably. In particular, the robotic system 200 may shift the weight on to the robotic foot 226 as the robotic leg 212 swings forward to take a step. Further, the robotic system 200 may shift the weight on to the robotic foot 228 as the robotic leg 210 swings forward to take a step.

The robotic system 200 may be operable through remote controls. Yet, the robotic system 200 may also be operable autonomously. For example, the robotic system 200 may include control algorithms that maintain the stability and balance of the robotic system 200. These algorithms may implement a push-recovery capability such that the robotic system 200 may maintain its balance after a force is applied to the robotic system 200. This capability may cause the robotic system 100 to reposition the robotic legs 210 and 212, and the robotic feet 226 and 228. For instance, the robotic system 200 may maintain balance on the robotic legs 210 and 212, and the robotic feet 226 and 228 after being hit, kicked, and/or shoved. The robotic system 200 may be capable of computing approximately 70 to 270 placements of the robotic legs 210 and 212, and the robotic feet 226 and 228 in less than approximately 0.1-1 milliseconds.

Figure 3:
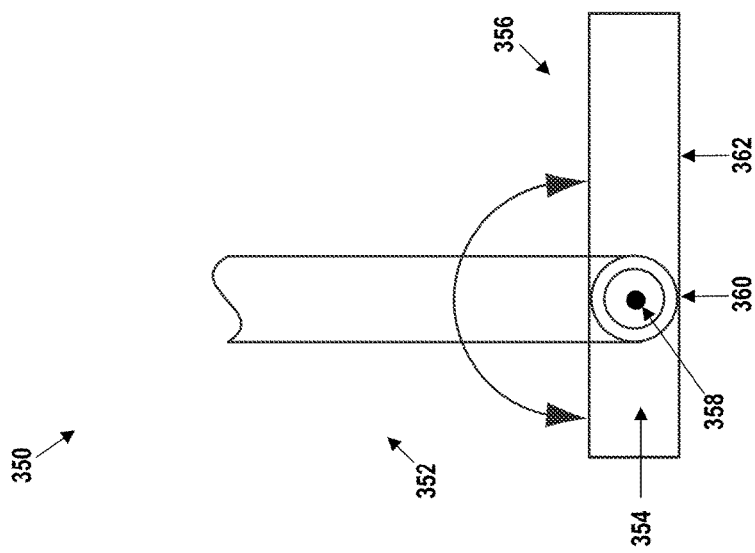
FIG. 3 depicts aspects of robotic systems, according to example implementations.
Figure 3:
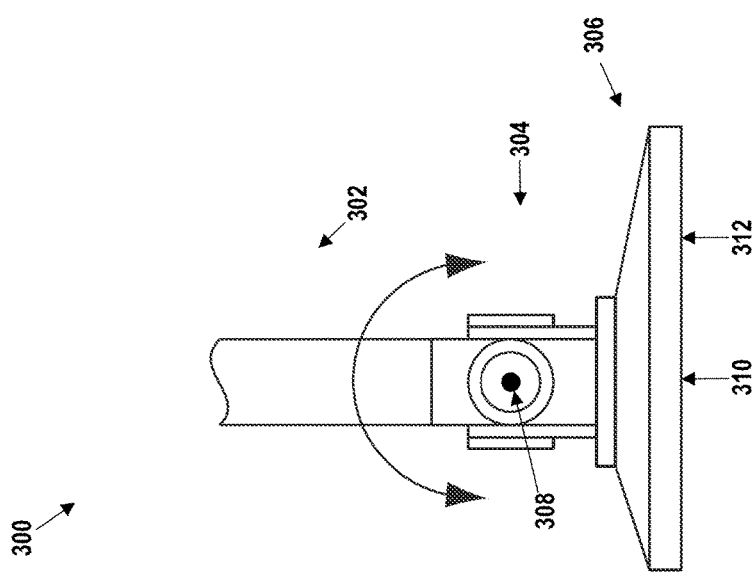

FIG. 3 depicts aspects of robotic systems, according to example implementations. The robotic systems 300 and 350 may take, for example, the form of a bipedal robot device and/or a multi-legged robot device such as a quadruped robot device, among various possibilities. In some implementations, the robotic systems 300 and 350 may include one or more parts of the robotic systems 100 and 200 described above in relation to FIGS. 1 and 2. Further, the robotic systems 300 and 350 may each take the form of the robotic system 200 described above in relation to FIG. 2.

As shown, the robotic system 300 may include the robotic leg 302 connected to a main body of the robotic system 300. Further, the robotic system 300 may include a robotic foot 306. Yet further, a zero moment point (ZMP) may be located at a first location 310 in the robotic foot 306 where a sum of a first number of forces acting on the robotic foot 306 is approximately equal to zero. These forces may include, for example, the weight of the robotic system 300 acting down on the first location 310 and a first ground force acting upwards against the first location 310, possibly such that the weight and the first force cancel each other out.

Further, the robotic system 300 may include a robotic ankle joint 304 connected to the robotic leg 302. The robotic ankle joint 304 may be located above the robotic foot 306. Further, the robotic leg 302 and the robotic foot 306 may be movable around an axis of rotation 308 defined by the robotic ankle joint 304.

To keep the ZMP confined to certain locations of the robotic foot 306, the robot system 300 may apply a torque about the robotic ankle joint 304. In particular, the robotic system 300 may use one or more motors incorporated with the robotic ankle joint 304 to apply the torque and cause movement around the robotic ankle joint 304. Thus, a measure of force applied by the robotic ankle joint 304 around the axis 308 may be greater than zero.

As such, the movement around the axis 308 may cause the ZMP to shift from the first location 310 to a second location 312 in the robotic foot 306. The second location 312 in the robotic foot 306 may be where a sum of the second number of forces acting on the robotic foot 306 may be approximately equal to zero. These forces may include, for example, the weight of the robotic system 300 acting down on the second location 312 and a second ground force acting upwards against the second location 312, possibly such that the weight and the second ground force cancel each other out. Thus, the torque applied about the robotic ankle joint 304 may balance the weight of the robot system 300 over the second location 312 of robotic foot, causing the ZMP to be confined to the certain locations of the robotic foot 306.

Thus, the robotic ankle joint 304 may add another source of torque to the robotic system 300. Yet, the amount of torque applied by the robotic ankle joint 304 may be difficult to determine or control. In particular, it may be difficult to determine the amount of torque necessary to confine the ZMP to the first and second locations 310 and 312, respectively. Further, the complexity of full-body dynamics in the robotic system 300 may further complicate the process for determining this amount of torque.

In another example implementation, the robotic system 350 may include a robotic leg 352 connected to a main body of the robotic system 350. Further, the robotic system 350 may include a robotic foot 356. Yet further, a ZMP may be located at a first location 360 in the robotic foot 356 where a sum of a first number of forces acting on the robotic foot is approximately equal to zero.

Further, the robotic system 350 may include a robotic sole joint 354 connected to the robotic leg. The robotic sole joint 354 may be located at a sole of the robotic foot 356. Further, the robotic leg 352 and the robotic foot 356 may be movable around an axis of rotation 358 defined by the robotic sole joint 354. Yet further, the robotic sole joint 354 may be located in other areas of the robotic foot 356, possibly proximate to the sole of the robotic foot 356. In some implementations, the robotic sole joint 354 may be located at a heel portion and/or a central portion of the robotic foot 356, e.g., a plantar portion of the robotic foot 356. Yet further, the robotic sole joint 354 may be located in between the heel portion and the central portion of the robotic foot 356. Further, the robotic sole joint 354 may be linearly movable along the sole of the robotic foot 356, possibly between the heel portion and the central portion of the robotic foot 356.

Further, a movement around the axis 358 may cause the ZMP to shift from the first location 360 to a second location 362 in the robotic foot 356. The second location 362 may be where a sum of the second number of forces acting on the robotic foot 356 is approximately equal to zero. In addition, a measure of force applied by the robotic sole joint 360 around the axis 358 may be approximately equal to zero. As such, the movement around the axis 358 may cause the ZMP to shift from the first location 360 to the second location 362 without one or more motors applying a torque force about the axis 358. For example, the movement around the axis 358 may shift the ZMP to the second location 362 and the torque force applied by one or more motors in the robotic sole joint 354 may be approximately equal to zero.

Yet, the robotic leg 352 may include devices with one or more motors that generate heat and are cooled in the robotic leg 352. As such, the movement around the axis 358 may be caused by the one or more motors rotating the robotic leg 352 around the axis 358. As such, the movement around the axis may include a rotation of the robotic leg 352 around the axis 358 and/or a rotation of the robotic foot 356 around the axis 358.

For example, consider that the robotic leg 352 takes the form of the robotic leg 210 described above in relation to FIG. 2. Yet, the robotic leg 352 may include the robotic sole joint 354, possibly in lieu of the robotic ankle joint 222. Further, the robotic leg 352 may include a robotic knee joint that may take the form of the robotic knee joint 218. Thus, the robotic knee joint may direct the robotic leg 352 such that the robotic foot 356 makes contact with a ground surface, possibly causing the robotic leg 352 to rotate about the axis 358.

In some implementations, the first number of forces may include a ground force acting against the first location 360 of the robotic foot 356. Further, the weight of the robotic system 350 over the robotic sole joint 360 may act against the ground force. Yet further, the second number of forces may include a ground force acting against the second location 362 of the robotic foot 356. In addition, the movement around the axis 358 may cause the robotic system 300 to shift weight of the robotic system 300 against the ground force acting against the second location 362. As such, the sole of the robotic foot 356 may include the first location 360 and a central portion of the robotic foot 356 may include the second location 362.

Figure 4:
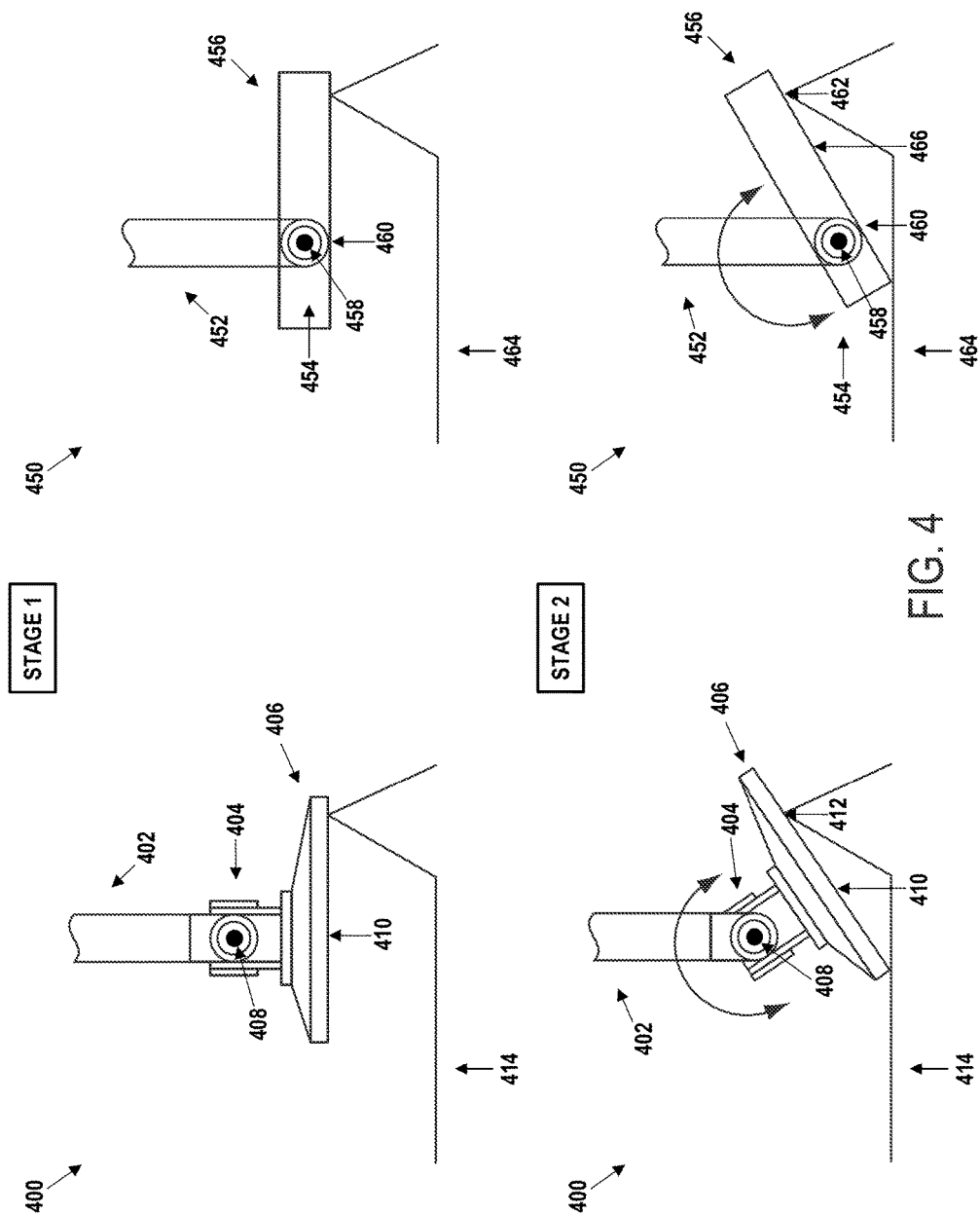
FIG. 4 depicts aspects of robotic systems, according to example implementations.

FIG. 4 depicts aspects of robotic systems, according to example implementations. The robotic systems 400 and 450 may take, for example, the form of a bipedal robot device and/or a multi-legged robot device such as a quadruped robot device, among various possibilities. In some implementations, the robotic systems 400 and 450 may include one or more parts of the robotic systems as described above in relation to FIGS. 1 through 3. Further, the robotic systems 400 and 450 may each take the form of the robotic system 200 described above in relation to FIG. 2.

As shown in stage 1, the robotic system 400 may also take the form of the robotic system 300 described above in relation to FIG. 3. For example, the robotic system 400 may include the robotic leg 402 connected to a main body of the robotic system 400. Further, the robotic system 400 may include a robotic foot 406. Yet further, a ZMP may be located at a first location 410 in the robotic foot 406 where a sum of a first number of forces acting on the robotic foot 406 is approximately equal to zero, possibly such that a ground force from the ground 414 acting upwards against the first location 410 is approximately equal to zero.

Further, the robotic system 400 may include a robotic ankle joint 404 connected to the robotic leg 402. The robotic ankle joint 404 may be located above the robotic foot 406. Further, the robotic leg 402 and the robotic foot 406 may be movable around an axis of rotation 408 defined by the robotic ankle joint 404.

Further, the robot system 400 may apply a torque about the robotic ankle joint 404, possibly to keep the ZMP confined to certain locations of the robotic foot 406. In particular, the robotic system 400 may use one or more motors incorporated with the robotic ankle joint 404 to apply the torque and cause movement around the robotic ankle joint 404. Thus, a measure of force applied by the robotic ankle joint 404 around the axis 408 may be greater than zero.

As shown in stage 2, the movement around the axis 408 may cause the ZMP to shift from the first location 410 to a second location 412 in the robotic foot 406. The second location 412 in the robotic foot 406 may be where a sum of the second number of forces acting on the robotic foot 406 may be approximately equal to zero. These forces may include, for example, the weight of the robotic system 400 acting down on the second location 412 and a second ground force from ground 414 acting upwards against the second location 412. Further, the weight and the second ground force may cancel each other out. Thus, the torque applied about the robotic ankle joint 404 may balance the weight of the robot system 400 over the second location 412 of robotic foot, causing the ZMP to be confined in the certain locations of the robotic foot 406.

Thus, the robotic ankle joint 404 may add another source of torque to the robotic system 400. Yet, the amount of torque applied by the robotic ankle joint 404 may be difficult to determine or control. In particular, it may be difficult to determine the amount of torque necessary to confine the ZMP to the first and second locations 410 and 412, respectively. Further, the complexity of full-body dynamics in the robotic system 400 may further complicate the process for determining this amount of torque. For example, the amount of torque applied by the robotic ankle joint 404 may be different when the robotic system 400 is standing on a flat surface versus the surface 414.

In another example implementation, the robotic system 450 may take the form of the robotic system 350 in relation to FIG. 3. As shown in stage 1, the robotic system 450 may include a robotic leg 452 connected to a main body of the robotic system 450. Further, the robotic system 450 may include a robotic sole joint 454 connected to the robotic leg 452. The robotic sole joint 454 may take, for example, the form of the robotic sole joint 354 described above in relation to FIG. 3. Further, the robotic sole joint 454 may be located at a sole of a robotic foot 456. Further, a ZMP may be located at a first location 460 in the robotic foot 456 where a sum of a first number of forces acting on the robotic foot 456 is approximately equal to zero, possibly such that a ground force from the ground 464 acting upwards against the first location 460 is approximately equal to zero.

In some implementations, the robotic system 450 may include one or more processors. Further, the robotic system 450 may include a computer-readable medium having stored thereon program instructions that, when executed by the one or more processors, cause the robotic system 450 to perform operations. For example, the computer-readable medium may be a non-transitory computer-readable medium described above in relation to FIG. 1.

As shown in stage 2, based on the one or more processors executing the instructions, a second location 462 may be determined in the robotic foot 456 to balance weight of the robotic system 450 on the robotic foot 456. For example, the robotic system 450 may include sensors such as a ground force sensor and/or a friction sensor, as described above in relation to FIG. 1. Further, the robotic system 450 may receive data from such sensors regarding one or more surfaces of the ground 464 underneath the robotic foot 456. Yet further, the robotic system 450 may receive data from these sensors indicative of the second location 462 of the robotic system 450 in relation to the ground 464 underneath robotic foot 456. In particular, the data may indicate that the second location 462 is where the robotic foot 456 makes contact with the ground 464.

Further, the robotic system 450 may cause movement around an axis of rotation 458 defined by the robotic sole joint 454. Yet further, the movement may cause the ZMP to shift from the first location 460 to a second location 462 in the robotic foot 456. The second location 462 may be where a sum of a second number of forces acting on the robotic foot 456 is approximately equal to zero. These forces may include, for example, the weight of the robotic system 450 acting down on the second location 462 and a second ground force from ground 464 acting upwards against the second location 462. Further, the weight and the second ground force may cancel each other out.

In addition, a measure of force applied by the robotic sole joint 454 around the axis 458 may be approximately equal to zero, possibly as described above for the robotic sole joint 360 in relation to FIG. 3. For example, the movement around the axis 458 may shift the ZMP to the second location 462 and the torque force applied by one or more motors in the robotic sole joint 454 may be approximately equal to zero.

Further, the robotic leg 452 may include devices with one or more motors that generate heat and are cooled in the robotic leg 452. As such, causing the movement around the axis 458 may include the one or more motors causing the robotic leg 452 to rotate around the axis 458. As such, causing the movement around the axis 458 may include causing the robotic leg 452 to rotate around the axis 458 and/or causing the robotic foot 456 to rotate around the axis 458. For example, the robotic leg 452 may include a robotic knee joint that may take the form of the robotic knee joint 218. Thus, the robotic knee joint may direct the robotic leg 452 such that the robotic foot 456 makes contact with the ground 456, possibly causing the robotic leg 452 to rotate about the axis 458.

In some implementations, the first number of forces may include a ground force acting against the first location 460 of the robotic foot 456. Further, the weight of the robotic system 450 over the robotic sole joint 454 may act against the ground force. In some implementations, the second number of forces may include a ground force from ground 464 acting against the second location 462 of the robotic foot 456. As such, the movement around the axis 458 may cause the robotic system 450 to shift the weight of the robotic system 450 against the ground force. Thus, the sole of the robotic foot 456 may include the first location 460 and a central portion of the robotic foot may include the second location 462.

Yet further, one or more intermediate locations 466 may be determined from the first location 460 to the second location 462. Further, the movement around the axis 458 may cause the ZMP to shift from the first location 460 to the one or more intermediate locations 466. In particular, the one or more intermediate locations 466 may determine a trail or a path for shifting the ZMP from the first location 460 to the second location 462.

Figure 5:
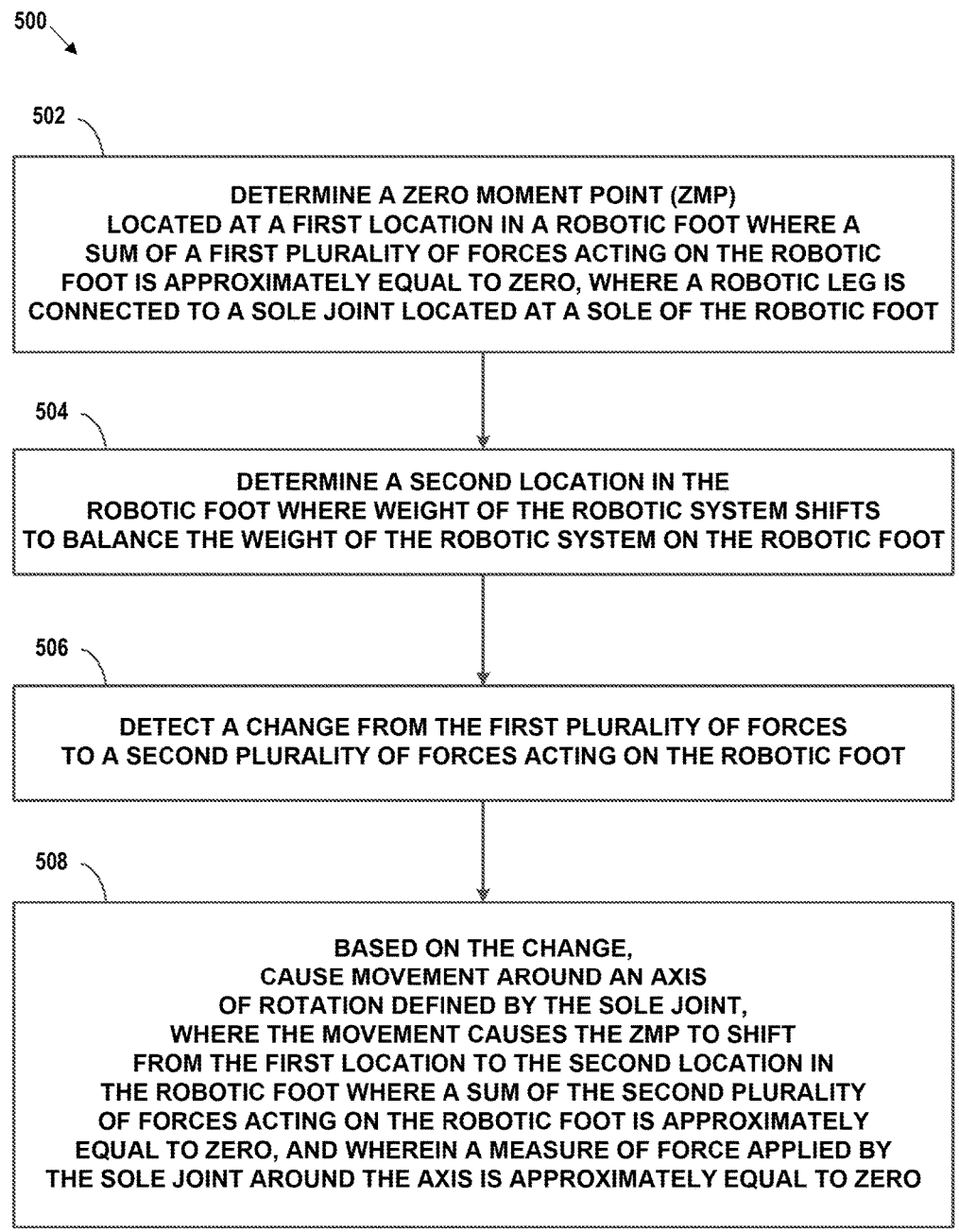
FIG. 5 is a flow chart, according to example implementations.

FIG. 5 is flow chart 500, according to example implementations. The implementations may be carried out by one or more of the robotic systems as described above in relation to FIGS. 1-4.

At step 502, a robotic system may determine a zero moment point (ZMP) located at a first location in a robotic foot where a sum of a first number of forces acting on the robotic foot is approximately equal to zero, where a robotic leg is connected to a robotic sole joint located at a sole of the robotic foot. For example, referring back to stage 1 of FIG. 4, the robotic system 450 may determine the ZMP located in the first location 460 in the robotic foot 456 where a sum of a first number of forces acting on the robotic foot 456 is approximately equal to zero. As noted, the first number of forces may include a ground force acting against the first location 460 of the robotic foot 456. Further, the first number of forces may include the weight of the robotic system 400 over the robotic sole joint 454 acting against the ground force.

At step 504, the robotic system may determine a second location in the robotic foot where weight of the robotic system shifts to balance the weight of the robotic system on the robotic foot. For example, the robotic device 450 may determine the second location 462 in the robotic foot 456 where weight of the robotic system 450 shifts to balance the weight of the robotic system 450 on the robotic foot 456. In particular, the robotic system 450 may include, for example, a ground force sensor to receive data indicative of the second location 462 as described above in relation to FIG. 4. As such, the sole of the robotic foot 456 may include the first location 460 and a central portion of the robotic foot 456 may include the second location 462.

At step 506, the robotic system may detect a change from the first number of forces to a second number of forces acting on the robotic foot. For example, the robotic system 450 may detect a change from the first number of forces to a second number of forces acting on the robotic foot 456.

As noted, the robotic system 450 may receive data from these sensors indicative of the second location 462 of the robotic system 450 in relation to the ground 464 underneath robotic foot 456. Further, the robotic system 450 may include an accelerometer and a gyroscope that may take, for example, the form of the sensors 110 described above in relation to FIG. 1. Thus, the robotic system 450 may receive data from these sensors indicative of the change from the first number of forces to the second number of forces that may involve a movement such as a rotation, a velocity, an angular velocity, and/or an acceleration of the robotic system 450.

As noted, the second number of forces may include a ground force from ground 464 acting against the second location 462 of the robotic foot 456. As such, the robotic system 450 may detect that the second number of forces includes the weight of the robotic system 450 acting down on the second location 462, the ground force acting upwards against the second location 462, a friction acting backwards on the second location 462, and an acceleration force acting forwards on the second location 462, among other possibilities.

At step 508, based on the change, the robotic system may cause movement around an axis of rotation defined by the robotic sole joint, where the movement causes the ZMP to shift from the first location to the second location in the robotic foot where a sum of the second number of forces acting on the robotic foot is approximately equal to zero, and where a measure of force applied by the robotic sole joint around the axis is approximately equal to zero.

For example, the robotic system 450 may cause movement around an axis of rotation 458 defined by the robotic sole joint 454, as described above in relation to FIG. 4. Further, the movement may cause the ZMP to shift from the first location 460 to the second location 462 in the robotic foot 456 where a sum of the second number of forces acting on the robotic foot 456 is approximately equal to zero. As noted, the movement around the axis 458 may further cause the robotic system 450 to shift the weight of the robotic system 450 against the ground force.

Further, a measure of force applied by the robotic sole joint 454 around the axis 458 may be approximately equal to zero. For example, the movement around the axis 458 may shift the ZMP to the second location 462 and the torque force applied by one or more motors in the robotic sole joint 454 may be approximately equal to zero.

As noted, the robotic leg 452 may include devices with one or more motors that generate heat and are cooled in the robotic leg 452. As such, causing the movement around the axis 458 may further include the one or more motors causing the robotic leg 452 to rotate around the axis 452, possibly as described above in relation to FIGS. 3 through 4. As such, causing the movement around the axis may include causing the robotic leg 452 to rotate around the axis 458 and/or causing the robotic foot 456 to rotate around the axis 458, as described above in relation to FIG. 4.

Further, the robotic system 450 may determine one or more intermediate locations 466 from the first location 460 to the second location 462. As noted, the movement around the axis 458 may further cause the ZMP to shift from the first location 460 to the one or more intermediate locations 466, possibly for shifting the ZMP from the first location 460 to the second location 462. In particular, the one or more intermediate locations 466 may determine a trail or a path for shifting the ZMP from the first location 460 to the second location 462.

As such, the example implementations above may be carried out by the robotic system 450 to cause movement around the robotic sole joint 454 and confine the ZMP to certain locations of the robotic foot 456. As such, the robotic system 450 may maintain its balance on the robotic foot 456 throughout various movements and positions of the robotic system 450. Yet, the example implementations may also be carried out by other robotic system that may take various forms.

III. ADDITIONAL EXAMPLES OF ROBOTIC SYSTEMS

Figure 6:
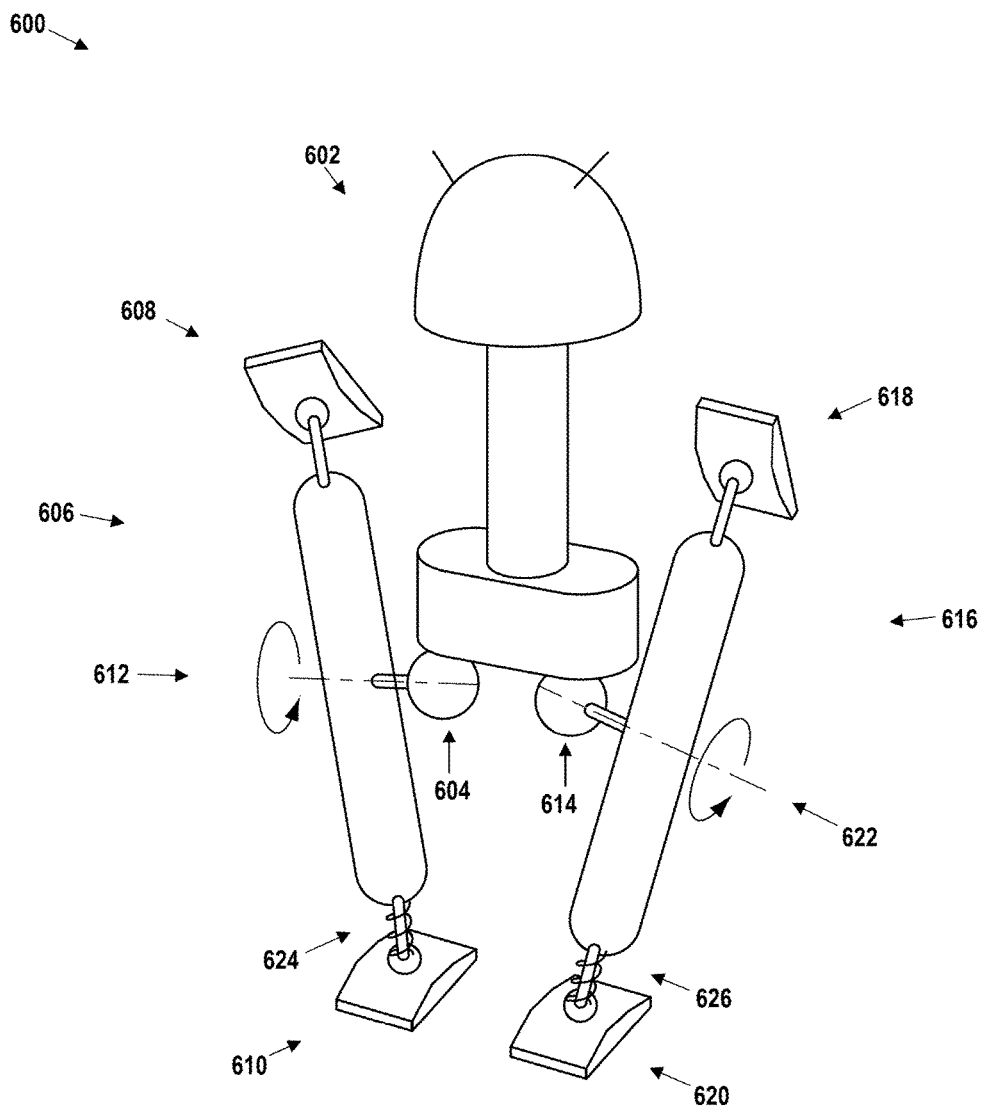
FIG. 6 depicts aspects of a robotic system, according to an example implementation.

FIG. 6 depicts aspects of a robotic system, according to an example implementation. The robotic system 600 may take, for example, the form of a bipedal robot device and/or a multi-legged robot device such as a quadruped robot device, among various possibilities. Further, the robotic system 600 may include, for instance, one or more of the parts described above in relation to robotic systems described above in relation to FIGS. 1 through 5.

As shown in FIG. 6, the robotic system 600 may include a robotic body 602, a robotic hip 604 connected to the robotic body 602, and a robotic leg 606 connected to the robotic hip 604. A first robotic foot 608 may be connected to one end of the robotic leg 606 and a second robotic foot 610 may be connected to an opposite end of the robotic leg

606. The robotic leg 606 may be fully rotatable around an axis of rotation 612 defined by the robotic hip 604. Further, the robotic hip 604 may be linearly movable along the robotic leg 606 to one or more positions between the one end of the robotic leg 606 and the opposite end of the robotic leg 606.

Yet further, the robotic system 600 may include a second robotic hip 614 connected to the robotic body 602 and a second robotic leg 616 connected to the second robotic hip 614. A third robotic foot 618 may be connected to one end of the second robotic leg 616 and a fourth robotic foot 620 may be connected to an opposite end of the second robotic leg 616. The second robotic leg 616 may be fully rotatable around a second axis of rotation 622 defined by the second robotic hip 614, as shown by the circular arrow around the second axis of rotation 622. In addition, the second robotic hip 614 may be linearly movable along the second robotic leg 616 to one or more positions between the one end of the second robotic leg 616 and the opposite end of the second robotic leg 616. For example, the second robotic hip 614 may be linearly moveable the robotic leg 616 to one or more positions between the third robotic foot 618 and the fourth robotic foot 620. The first, second, third, and fourth robotic feet 608, 610, 618, and 620, respectively, may each include a respective robotic sole joint described above in relation to FIGS. 1 through 5.

Further, the robotic leg 606 and the second robotic leg 608 may be partially or fully rotatable in the opposite directions of the circular arrows around the axes of rotation 612 and 622, respectively. The robotic legs 606 and 608 may rotate over varying axes of rotation 612 and 622, respectively. For example, the robotic hips 604 and 614 may be moveable over multiple degrees of freedom (DOF) to vary the axes of rotation 612 and 622, respectively. In particular, the robotic hips 604 and 606 may include ball and socket mechanisms to be movable over the multiple DOF, possibly to change the axes of rotation 612 and 622, respectively.

In some implementations, the robotic system 600 may include different types of robotic feet, possibly for bipedal walking without the windmill type movements. For example, the second robotic foot 610 may include a rubber base that facilitates friction against adjacent surfaces. For example, the rubber base may take the form of a rain shoe that creates friction against the adjacent surfaces covered in rain, snow, and/or other forms of liquids. Further, the first robotic foot 608 may include a wider base than the rubber base. For example, the wider base may distribute the weight of the robotic system 600 over more area of the adjacent surfaces than the rubber base. In some implementations, the wider base may take the form of a snow shoe that distributes the weight of the robotic system 600 over more area of the adjacent surfaces covered in snow. Further, the third robotic foot 618 may take any of the forms of the robotic foot 608 and the fourth robotic foot 620 may take any of the forms of the robotic foot 610, among other possibilities.

In some implementations, the robotic system 600 may include different types of robotic legs and/or robotic feet for various types of movements of the robotic system 600. Further, the robotic system 600 may include different types of feet for walking, jogging, running, and/or jumping. For example, the robotic foot 608 and the third robotic foot 618 may be used for walking, and the second robotic foot 610 and the fourth robotic foot 620 may be used for running and jumping, among other possibilities. Further, the robotic leg 606 may include a first spring 624 that applies a first force against the second robotic foot 610. Further, the second robotic leg 616 may include a second spring 626 that applies a second force against the fourth robotic foot 620. As such, the first spring and the second spring may store energy for applying the first force and the second force, respectively, thereby springing the robotic system 602 off ground surfaces.

In some implementations, the robotic system 600 may include a non-transitory computer-readable medium that stores program instructions executable by one or more processors, such as the processor 106 of the robotic system 100 described above in relation to FIG. 1. The program instructions may cause the robotic system 600 to perform operations. For example, the robotic hip 604 may move along the robotic leg 606 to a first position of the one or more positions between the one end of the robotic leg 606 and the opposite end of the robotic leg 606. Further, the second robotic hip 614 may move along the second robotic leg 616 to a second position of the one or more positions between the one end of the second robotic leg 616 and the opposite end of the second robotic leg 616.

In some implementations, a first length of the robotic leg 606 may be approximately equivalent to a second length of the second robotic leg 616. For example, the first position may be approximately half way between the one end of the robotic leg 606 proximately connected to the first robotic foot 608 and the opposite end of the robotic leg 606 proximately connected to the second robotic foot 610. Further, the second position may be approximately half way between the one end of the second robotic leg 616 proximately connected to the third robotic foot 618 and the opposite end of the second robotic leg 616 proximately connected to the fourth robotic foot 620. As such, the robotic system 600 may stand such that the robotic hip 604 may be approximately level with the second robotic hip 614.

In some implementations, the robotic system 600 may cause the robotic leg 606 to rotate up to 660 degrees around the axis of rotation 612 defined by the robotic hip 604 and cause the second robotic leg 616 to rotate up to 660 degrees around the second axis of rotation 622 defined by the second robotic hip 614. In particular, the robotic leg 606 and the second robotic leg 616 may rotate with an approximate phase difference of 90 degrees. Thus, the robotic leg 606 may rotate first followed by the second robotic leg 616 rotating thereafter.

In some implementations, the robotic system 600 may cause the robotic leg 606 up to rotate up to 180 degrees around the axis of rotation 612 defined by the robotic hip 604, where the weight of the robotic system 600 is shifted from being placed on the second robotic foot 610 to the first robotic foot 608. In particular, the robotic leg 606 may rotate in the direction of the circular arrow around the axis of rotation 612, thereby switching the weight from being placed on the second robotic foot 610 to the first robotic foot 608.

Further, the robotic system 600 may cause the second robotic leg 616 to rotate up to 180 degrees around the second axis of rotation 622 defined by the second robotic hip 614, where the weight of the robotic system is shifted from being placed on the fourth robotic foot 620 to the third robotic foot 618. In particular, the second robotic leg 616 may rotate in the direction of the circular arrow around the axis of rotation 622, thereby switching the weight from being placed on the fourth robotic foot 620 to the third robotic foot 618. Based on causing the robotic leg 612 and the second robotic leg 622 to rotate, the robotic system 600 may take an initial step with the first robotic foot 608 and a subsequent step with the third robotic foot 618.

Figure 7:
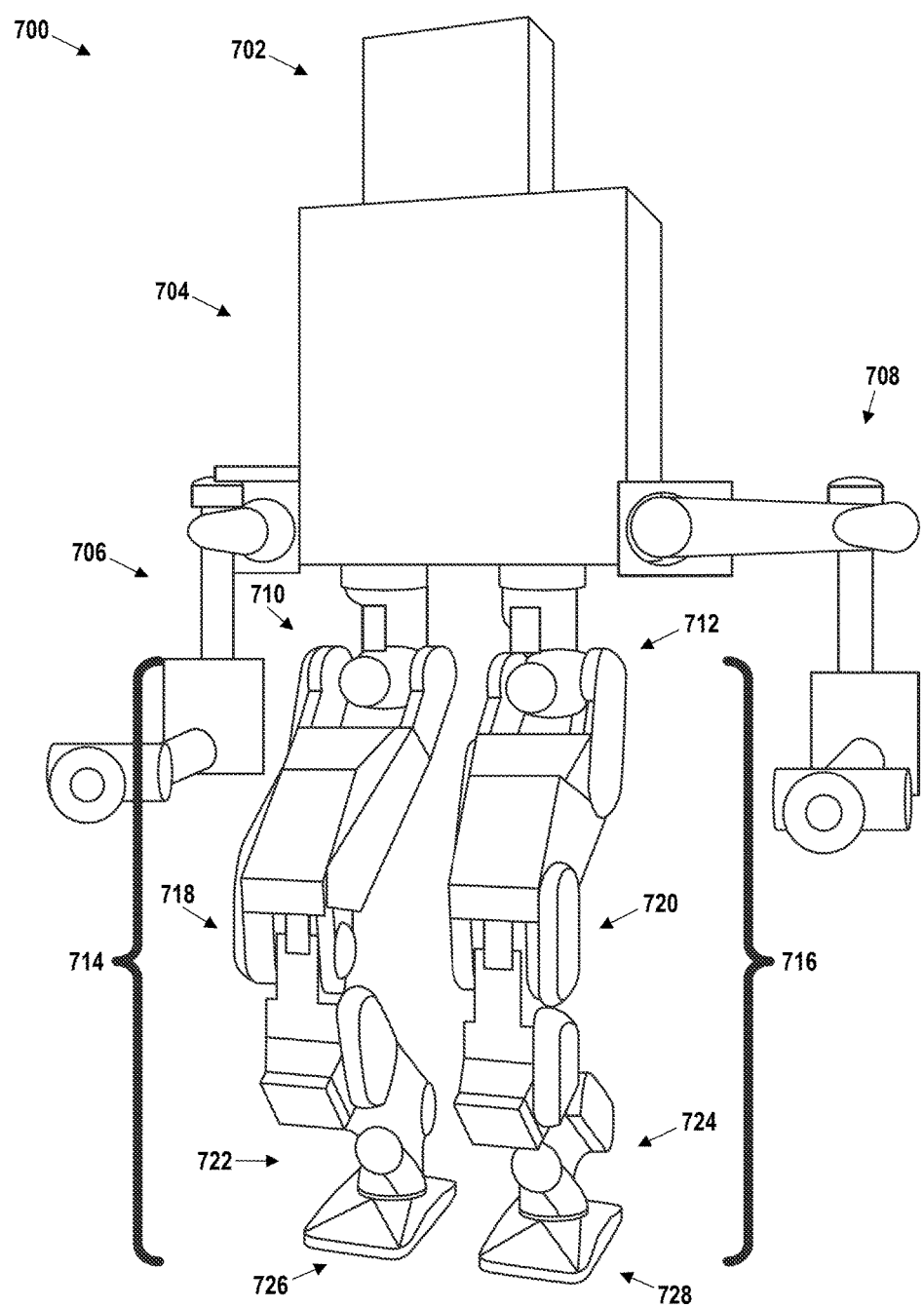
FIG. 7 depicts aspects of a robotic system, according to an example implementation.

FIG. 7 depicts a robotic system, according to an example implementation. The robotic system 700 may include, for example, one or more parts of the robotic systems described above in relation to FIGS. 1-6. For example, the robotic legs 714 and 716 may include sensors 110 such as a sensor that measures inertial forces and/or G-forces in multiple dimensions, a force-torque sensor, a ground force sensor, a friction sensor, and/or a ZMP sensor, among other possibilities. Further, the robotic system 700 may include one or more motors that generate heat and are cooled by lower temperature liquids around the motors. As such, the robotic system 700 may also engage in bipedal walking.

The robotic system 700 may include a robotic head 702, a robotic body 704, two robotic arms 706 and 708, two robotic hips 710 and 712, and two robotic legs 714 and 716. Further, the robotic legs 714 and 716 may include two robotic knees 718 and 720, two robotic ankles 722 and 724, and two robotic feet 726 and 728, respectively. The two robotic feet 726 and 728 may each include a respective robotic sole joint described above in relation to FIGS. 1 through 6. As such, the robotic system 700 may be capable of using robotic arms 706 and 708 to interact with an environment, possibly beyond the capabilities of the robotic system 300.

Figure 8:
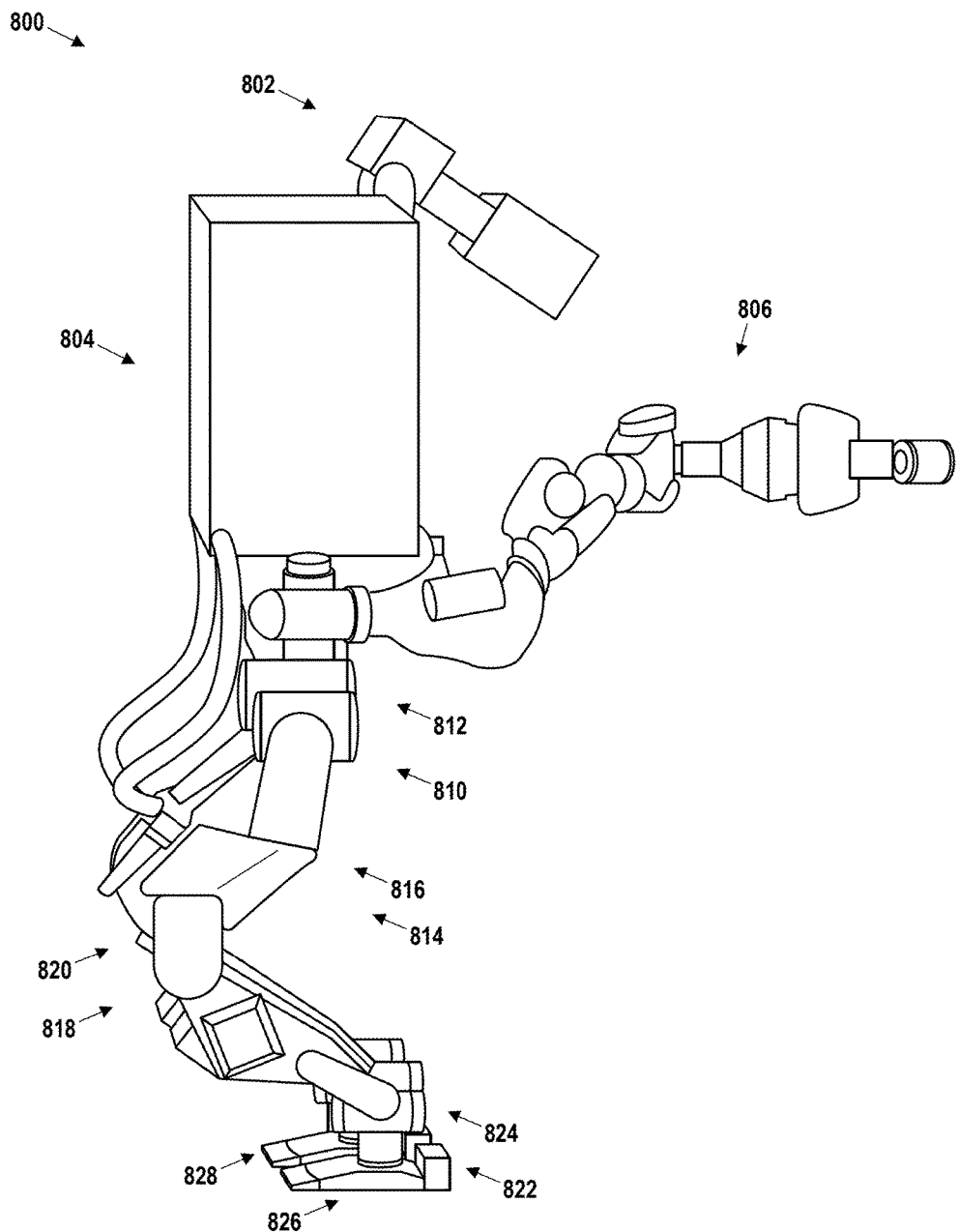
FIG. 8 depicts aspects of a robotic system, according to an example implementation.

FIG. 8 depicts aspects of a robotic system, according to an example implementation. The robotic system 800 may include, for example, one or more parts of the robotic systems described above in relation to FIGS. 1-8. As shown, FIG. 8 may illustrate a side view of the robotic system 800. The robotic system 800 may include a robotic head 802, a robotic body 804, a robotic arm 806, a robotic hip 810, a second robotic hip 812, a robotic leg 814, and a second robotic leg 816. Further, the robotic legs 814 and 816 may include a robotic knee 818 and a second robotic knee 820, respectively. Further, the robotic legs 814 and 816 may include a robotic ankle 822 and a second robotic ankle 824, and a robotic foot 826 and a second robotic foot 828, respectively. The two robotic feet 826 and 828 may each include a respective robotic sole joint described above in relation to FIGS. 1 through 7.

In some implementations, the robotic systems described above in relation to FIGS. 1-8 may be used in environments involving natural and human-made disasters. For example, these robotic systems may perform activities in disaster zones to help victims in the vicinity of such disaster zone. In particular, these robotic systems may adapt to various types of sites that the robotic systems may not have previously encountered. As such, these robotic systems may demonstrate some autonomy in making decisions and data obtained from sensors 110. Further, these robotic systems may be controlled remotely based on receiving one or more commands to perform operations.

For example, the robotic systems may travel through areas that may be unsafe for living beings. In particular, these robotic systems may operate in natural disaster areas affected by earthquakes, fires, natural gas leaks, and/or exposures to radioactive elements, among other possible areas. For example, the robotic system 700 of FIG. 7 may open a door using the robotic arms 706 and 708. Further, the robotic arms 706 and/or 708 may keep the door open while the robotic legs 714 and 716 walk through the doorway. The robotic system 700 may pick up debris that obstructs pathways, possibly using the robotic arms 706 and 708 to move the debris. The robotic system 700 may cut through walls using one or both of the robotic arms 706 and/or 708. For example, the robotic arm 706 may include a saw that may protrude from the robotic arm 706 such that the robotic arm 706 may be directed to cut an opening into a wall. As such, the robotic system 700 may create escape routes for saving living beings that may be trapped in confined areas.

The robotic systems may operate a diverse assortment of tools, possibly designed to be used by human persons. For example the robotic system 800 may identify a hose that may be connected to water valve. The robotic system 800 may carry the hose and connect the hose to the water valve using the robotic arm 806. Further, the robotic system 800 may use the robotic arm 806 to turn a wheel of the valve that allows water to flow through the valve and into the hose. As such, the robotic system 800 may control the valve and carry the hose to various locations, providing water to such locations.

In some implementations, the robotic systems may be used in various manufacturing facilities. For example, the robotic systems may be used in an assembly line with multiple work stations along the assembly line that add parts to a partially-finished machine. The robotic systems may move parts to various work stations on the assembly line and also from one work station to another. Further, the robotic systems may place parts on the partially-finished machine to facilitate the creation of a finished machine, among other possibilities.

Figure 9:
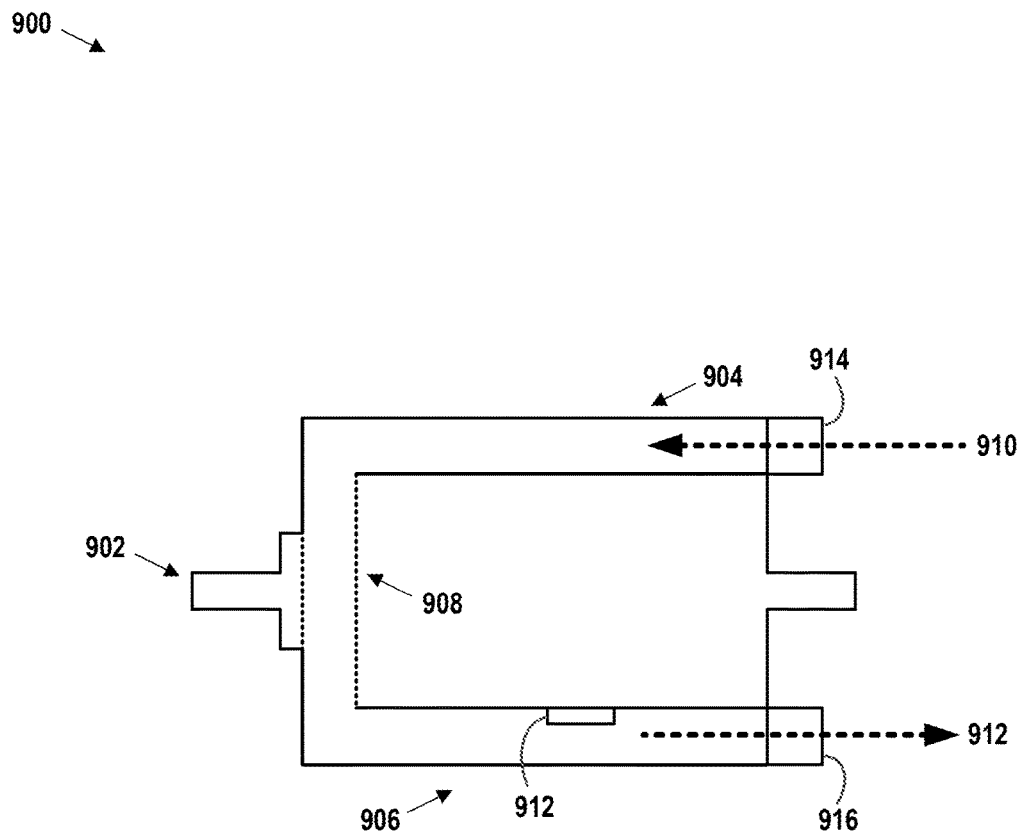
FIG. 9 depicts aspects of a liquid-cooled device, according to an example implementation.

FIG. 9 depicts aspects of a liquid-cooled device 900, according to an example implementation. The liquid-cooled device 900 may be incorporated, for example, with the robotic systems as described above in relation to FIGS. 1-8. For example, the liquid-cooled device 900 may be incorporated with any of the motors described above, such as the motors described above in relation to FIGS. 3 through 5. Further, one or more liquid-cooled devices 900 may be incorporated in the hips 604 and 614 of the robotic system 600. In particular, the one or more liquid-cooled devices 900 may include motors to move the robotic hips 604 and 614 along robotic legs 606 and 616, respectively.

For example, one or more liquid-cooled devices 900 may be used to move the robotic hip 604 along the robotic leg 606 to a first position of the one or more positions between the one end of the robotic leg 606 and the opposite end of the robotic leg 606. Further, the one or more liquid-cooled devices 900 may be used to move the second robotic hip 614 along the second robotic leg 616 to a second position of the one or more positions between the one end of the second robotic leg 616 and the opposite end of the second robotic leg 616, as described above in relation to FIG. 6. Yet further, the one or more liquid-cooled devices 900 may include motors that move along the ball screws 628 and 630, respectively, as described above in relation to FIG. 6.

As shown, FIG. 9 may illustrate a side view of the liquid-cooled device 900. The liquid-cooled device 900 may be a water-cooled device that actively controls the temperature of the motor 902. For example, the liquid-cooled device 900 may estimate the internal temperature of the motor 902 and based on such estimations, the liquid-cooled device 900 may cool the motor 902 by passing cooling liquids around the motor 902. As such, robotic systems with the liquid-cooled device 900 may be able to create high torque forces using the motor 902 to move robotic limbs, but also prevent overheating the motor 902.

The motor 902 may be a 50-350 Watt brushless motor operable at high speeds. Channels 904, 906, and 908 may make contact with the motor 902 to absorb, transfer, and/or displace heat (e.g., thermal energy) from the motor 902, possibly to reduce the temperature of the motor 902. Further, the channels 904-908 may encapsulate the motor 902, possibly to increase contact with the surface area of the motor 902. Thus, the channels 904-908 may absorb heat produced by the motor 902 and the surface contact of the channels 904-1008 with the motor 902 may cool the motor 902.

Valves 914 and 916 may control liquids flowing in and out of channels 904 and 906, respectively. For example, a liquid 910 may flow into the channel 904 to cool the motor 902 and a liquid 912 may flow out of channel 906. The liquid 910 may have a lower temperature than the motor 902 and the liquid 912 may have a higher temperature than the liquid 910. Thus, the channels 904 and 906 may be connected by channel 908 such that the liquid 910 may flow into channel 904 through channel 908 and liquid 912 may flow out of the channel 906. In some implementations, there may be a constant flow of liquid 910 flowing into the channel 904 and liquid 912 flowing out of the channel 906. Further, the liquid 912 may flow into a reservoir to cool the liquid 912 such that the liquid 912 may flow back into channel 904 to cool the motor 902. The liquids 910 and 912 may also flow in an opposite direction such that liquid 912 may flow into channel 906 through channel 908 and liquid 910 may flow out of channel 904.

The temperature of a motor may be difficult to determine. As such, the channel 906 may include a sensor 912. The sensor 912 may include, for example, one or more of the sensors 110 described above in relation to FIG. 1. Thus, the sensor 912 may determine the temperature of the liquid 910 to estimate the temperature of the motor 902. For example, the sensor 912 may determine that the temperature of the liquid 912 meets or exceeds a temperature threshold, possibly approximating 90 to 150 degrees Celsius. As such, the valve 916 may open to release the liquid 910.

A robotic system may include a driver operable to deliver high current to the motor 902. By using high power sources to power the driver, the driver may deliver approximately 40-240 Amperes to the motor 902. Further, the driver may include a copper layer that may also be cooled by channels 904-908 of the liquid-cooled device 900 and the liquids 908 and 910. As such, with measures for preventing overheating, the maximum current of the motor 902 may be approximately 20 times greater than conventional motors. Thus, the drivers enable the motor 902 to produce larger torque forces in a shortened period of time.

IV. CONCLUSION

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims.

We claim:

1. A robotic system comprising:
   a robotic leg connected to a main body;
   a robotic foot, wherein a zero moment point (ZMP) is located at a first location in the robotic foot where a sum of a first plurality of forces acting on the robotic foot is approximately equal to zero;
   a robotic sole joint coupling the robotic leg to the robotic foot, wherein the robotic sole joint is located at a sole of the robotic foot, wherein the robotic leg and the robotic foot are movable around an axis of rotation defined by the robotic sole joint, wherein a movement around the axis causes the ZMP to shift from the first location to a second location in the robotic foot where a sum of a second plurality of forces acting on the robotic foot is approximately equal to zero, and wherein a measure of force applied by the robotic sole joint around the axis is approximately equal to zero.

2. The robotic system of claim 1, wherein the movement around the axis comprises one or more of: a rotation of the robotic leg around the axis and a rotation of the robotic foot around the axis.

3. The robotic system of claim 1, wherein the sole of the robotic foot comprises the first location and a central portion of the robotic foot comprises the second location.

4. The robotic system of claim 1, wherein the first plurality of forces comprises a ground force acting against the first location of the robotic foot, and wherein a weight of the robotic system over the robotic sole joint acts against the ground force.

5. The robotic system of claim 1, wherein the second plurality of forces comprises a ground force acting against the second location of the robotic foot, and wherein the movement around the axis causes the robotic system to shift weight of the robotic system against the ground force.

6. The robotic system of claim 1, wherein the robotic leg comprises one or more motors, and wherein the movement around the axis is caused by the one or more motors rotating the robotic leg around the axis.

7. A robotic system comprising:
   one or more processors;
   a robotic leg connected to a main body;
   a robotic foot;
   a robotic sole joint coupling the robotic leg to the robotic foot, wherein the robotic sole joint is located at a sole of the robotic foot, and wherein a zero moment point (ZMP) is located at a first location in the robotic foot where a sum of a first plurality of forces acting on the robotic foot is approximately equal to zero; and
   a computer-readable medium having stored thereon program instructions that, when executed by the one or more processors, cause the robotic system to perform operations comprising:
      determining a second location in the robotic foot to balance weight of the robotic system on the robotic foot; and
      causing movement around an axis of rotation defined by the robotic sole joint, wherein the movement causes the ZMP to shift from the first location to the second location in the robotic foot where a sum of a second plurality of forces acting on the robotic foot is approximately equal to zero, and wherein a measure of force applied by the robotic sole joint around the axis is approximately equal to zero.

8. The robotic system of claim 7, wherein causing the movement around the axis comprises one or more of: causing the robotic leg to rotate around the axis and causing the robotic foot to rotate around the axis.

9. The robotic system of claim 7, wherein the sole of the robotic foot comprises the first location and a central portion of the robotic foot comprises the second location.

10. The robotic system of claim 7, wherein the first plurality of forces comprises a ground force acting against the first location of the robotic foot, and wherein a weight of the robotic system over the robotic sole joint acts against the ground force.

11. The robotic system of claim 7, wherein the second plurality of forces comprises a ground force acting against the second location of the robotic foot, and wherein the movement around the axis further causes the robotic system to shift the weight of the robotic system against the ground force.

12. The robotic system of claim 7, wherein the robotic leg comprises one or more liquid-cooled devices, and wherein causing the movement around the axis further comprises the liquid-cooled devices causing the robotic leg to rotate around the axis.

13. The robotic system of claim 7, the operations further comprising determining one or more intermediate locations from the first location to the second location, and wherein the movement around the axis further causes the ZMP to shift from the first location to the one or more intermediate locations.

14. A method comprising:
   determining a zero moment point (ZMP) located at a first location in a robotic foot where a sum of a first plurality of forces acting on the robotic foot is approximately equal to zero, wherein a robotic leg is coupled to the robotic foot via a robotic sole joint located at a sole of the robotic foot;
   determining a second location in the robotic foot where weight of the robotic system shifts to balance the weight of the robotic system on the robotic foot;
   detecting a change from the first plurality of forces to a second plurality of forces acting on the robotic foot; and
   based on the change, causing movement around an axis of rotation defined by the robotic sole joint, wherein the movement causes the ZMP to shift from the first location to the second location in the robotic foot where a sum of the second plurality of forces acting on the robotic foot is approximately equal to zero, and wherein a measure of force applied by the robotic sole joint around the axis is approximately equal to zero.

15. The method of claim 14, wherein causing the movement around the axis comprises one or more of: causing the robotic leg to rotate around the axis and causing the robotic foot to rotate around the axis.

16. The method of claim 14, wherein the sole of the robotic foot comprises the first location and a central portion of the robotic foot comprises the second location.

17. The method of claim 14, wherein the first plurality of forces comprises a ground force acting against the first location of the robotic foot, and wherein the weight of the robotic system over the robotic sole joint acts against the ground force.

18. The method of claim 14, wherein the second plurality of forces comprises a ground force acting against the second location of the robotic foot, and wherein the movement around the axis further causes the robotic system to shift the weight of the robotic system against the ground force.

19. The method of claim 14, wherein the robotic leg comprises one or more motors, and wherein causing the movement around the axis further comprises the one or more motors causing the robotic leg to rotate around the axis.

20. The method of claim 14, further comprising determining one or more intermediate locations from the first location to the second location, and wherein the movement around the axis further causes the ZMP to shift from the first location to the one or more intermediate locations.

* * * * *